(12) United States Patent
Davis, II

(10) Patent No.: US 7,854,451 B2
(45) Date of Patent: Dec. 21, 2010

(54) ANCHOR PILE COUPLING SYSTEM

(76) Inventor: Joseph S. Davis, II, 1603 Parkwood Dr., New Iberia, LA (US) 70560

( * ) Notice: Subject to any disclaimer, the term of this patent is extended or adjusted under 35 U.S.C. 154(b) by 446 days.

(21) Appl. No.: 11/847,314

(22) Filed: Aug. 29, 2007

(65) Prior Publication Data

US 2008/0157521 A1 Jul. 3, 2008

Related U.S. Application Data

(60) Provisional application No. 60/883,163, filed on Jan. 3, 2007.

(51) Int. Cl.
*F16L 21/00* (2006.01)

(52) U.S. Cl. .................. 285/404; 405/251; 405/252.1; 405/257

(58) Field of Classification Search .............. 285/404; 405/233, 237, 239, 244, 249, 251, 253, 252, 405/252.1, 257
See application file for complete search history.

(56) References Cited

U.S. PATENT DOCUMENTS

| | | | | |
|---|---|---|---|---|
| 975,488 A * | 11/1910 | Welsh | ............ | 405/252 |
| 1,080,283 A * | 12/1913 | Kenny | ............ | 52/750 |
| 1,087,334 A * | 2/1914 | Stevens | ............ | 405/257 |
| 1,258,482 A * | 3/1918 | Shuman | ............ | 405/233 |
| 2,080,493 A * | 5/1937 | Marsden | ............ | 405/245 |
| 3,308,627 A | 3/1967 | Guild | | |
| 3,345,826 A | 10/1967 | Hignite | | |
| 3,356,398 A | 12/1967 | Nilsson et al. | | |
| 3,368,830 A | 2/1968 | French | | |
| 3,748,863 A | 7/1973 | Pogonowski et al. | | |
| 3,796,057 A | 3/1974 | Dougherty | | |
| 4,060,260 A | 11/1977 | Boice | | |
| 4,124,231 A * | 11/1978 | Ahlstone | ............ | 285/18 |
| 4,209,193 A | 6/1980 | Ahlstone | | |
| 4,479,669 A * | 10/1984 | Hynes | ............ | 285/332.3 |
| 4,610,571 A | 9/1986 | Lees | | |
| 4,668,119 A | 5/1987 | Galletti | | |
| 4,915,544 A * | 4/1990 | Lin | ............ | 405/243 |
| 5,066,168 A * | 11/1991 | Holdeman | ............ | 405/249 |
| 5,575,593 A * | 11/1996 | Raaf | ............ | 405/237 |
| 5,707,180 A * | 1/1998 | Vickars et al. | ............ | 405/233 |
| 5,797,705 A * | 8/1998 | Kellner | ............ | 405/253 |
| 5,833,399 A * | 11/1998 | Bullivant | ............ | 405/233 |
| 5,934,836 A * | 8/1999 | Rupiper et al. | ............ | 405/244 |
| 5,975,808 A * | 11/1999 | Fujita | ............ | 405/244 |
| 6,468,003 B2 * | 10/2002 | Merjan et al. | ............ | 405/253 |
| 6,592,300 B2 * | 7/2003 | Yang et al. | ............ | 405/241 |
| 6,615,554 B2 * | 9/2003 | Rupiper | ............ | 52/157 |
| 6,814,525 B1 | 11/2004 | Whitsett | | |
| 6,820,379 B1 * | 11/2004 | Krinner et al. | ............ | 52/157 |
| 7,037,045 B2 * | 5/2006 | Jones | ............ | 405/252.1 |
| 7,090,437 B2 * | 8/2006 | Pinkleton | ............ | 405/244 |
| 7,146,704 B2 * | 12/2006 | Otten et al. | ............ | 29/525.01 |
| 7,314,335 B2 * | 1/2008 | Whitsett | ............ | 405/233 |
| 7,338,232 B2 * | 3/2008 | Nasr | ............ | 405/233 |
| 7,416,367 B2 * | 8/2008 | St. Onge et al. | ............ | 405/230 |
| 2004/0047693 A1 | 3/2004 | Nishiwaki et al. | | |

* cited by examiner

*Primary Examiner*—David E Bochna
(74) *Attorney, Agent, or Firm*—Neil J. Coig; nolaIP, LLC

(57) ABSTRACT

Disclosed is an anchor pile coupling system, consisting of a male and female pile coupling which can be attached to opposite ends of a piling, as well as a top drive which is used to apply rotational force to the piling string in order to guide it into the anchoring surface.

8 Claims, 5 Drawing Sheets

ANCHOR PILE COUPLING SYSTEM

This application is a continuation of Provisional U.S. Patent Application 60/883,163, filed on Jan. 3, 2007, which is hereby incorporated by reference in its entirety.

BACKGROUND OF THE INVENTION

The present invention relates to an apparatus that can be used to drive pilings and/or anchor piles and similar anchoring devices into the ground.

In the traditional mode of driving piles, large apparatus must be used to drive anchor piles into the ground. Once driven, these piles can be used for various tasks, ranging from anchor points to foundational supports, to tether points and more. Since pilings must be driven very deeply into the ground, it is a physical and logistical impossibility to transport and handle a piling which would be long enough to serve its purpose of being driven deep into the earth in a single section. To combat this, pilings are manufactured and delivered in sections, which must then be pieced together as part of the driving process into what is referred to herein as a "pile string", or series of pile sections forming a sufficiently long piling.

In the current state of the art, these pilings may be driven by immense downward force, such as a pneumatic hammer, or by turning the pilings into the ground via torque being applied to one end of the piling, and possibly aided by helical plates on the other end to help displace earth as the pile string is being driven, similar to the manner in which a drill bit bores material as it is driven into a surface.

Obvious downsides to the current mode of pile driving exist. Having an apparatus capable of delivering the enormous amounts of pressure to the end of a piling to drive it down by pneumatic or other action is not only expensive, but takes up large amounts of space, thus driving equipment costs up. Such driving or "hammering" of pilings is also loud and dangerous, requiring special permitting and is often restricted to certain areas of installation and use. In fact, in the inventor's state, pile driving is one of the few activities left that still carry strict liability upon the operator of the pile driving equipment.

The current method of applying rotational energy to a piling is similarly disadvantageous. Sections of piling are attached together by a very haphazard method of making the pilings of a malleable material and requiring a set of dies to form the sections of pipe for the pilings to conform to each other. Of course, as with any metal material, deforming and reshaping it with tools as crude as a hammer and dies weaken the material, which in the cases of the pile sections, are generally not constructed with this type of deformation in mind, to say nothing of the time and arduousness of having to form pile sections into shape just in order to drive them.

The consequence of these issues is increased cost, more dangerous operation, and an inferior installation. Breakages also occur because of the weakening of the metal in a "die" installation.

The present invention of a collar-based coupling system is thus a much-improved apparatus for driving or installing pilings, as it requires no deformation of the material, no noisy or complex machinery, and improves most every aspect of the piling operation while also featuring reduced cost and increased reliability.

All of these aspects of the current mode of driving anchor piles lead to an increased need for a revised method of driving these piles with minimized cost and complexity, all of which the present invention addresses.

Objects Of The Invention

One object of the invention is to provide a more efficient mode of installing anchor pilings.

Another object of this invention is to provide a more economical mode of installing anchor pilings.

Yet another object of this invention is to provide a more reliable mode of installing anchor pilings.

Still another object of this invention is to provide an easier way to install anchor pilings.

Other objects and advantages of this invention shall become apparent from the ensuing descriptions of the invention.

SUMMARY OF THE INVENTION

According to the present invention, an anchor pile coupling system is disclosed, consisting of a male and female pile coupling which can be attached to opposite ends of a piling, as well as a top drive which is used to apply rotational force to the piling string in order to guide it into the anchoring surface.

BRIEF DESCRIPTION OF THE DRAWINGS

The accompanying drawings and figures illustrate an embodiment of this invention. However, it is to be understood that this embodiment is intended to be neither exhaustive, nor limiting of the invention. They are but examples of some of the forms in which the invention may be practiced.

DETAILED DESCRIPTION OF EXEMPLARY EMBODIMENTS

Figure 1:
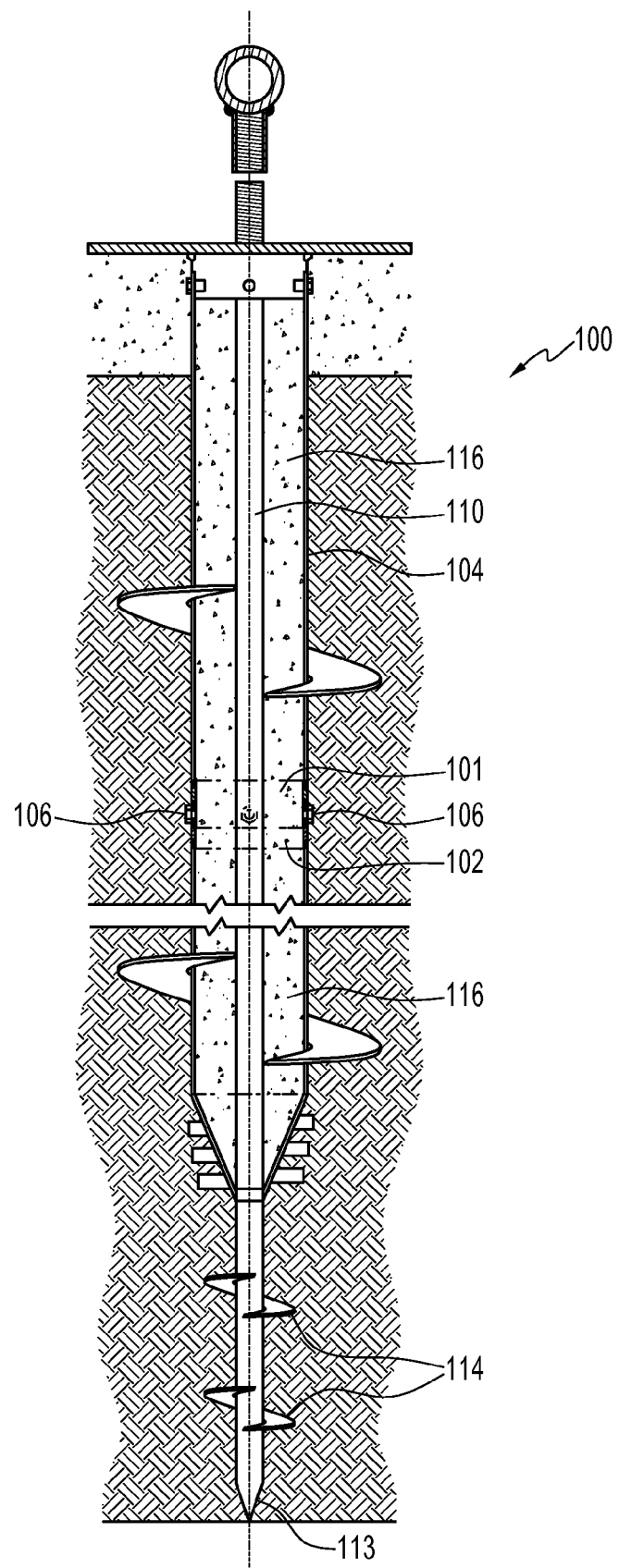
FIG. 1 is a cross-section view of the anchor pile coupling system.
Figure 2A:
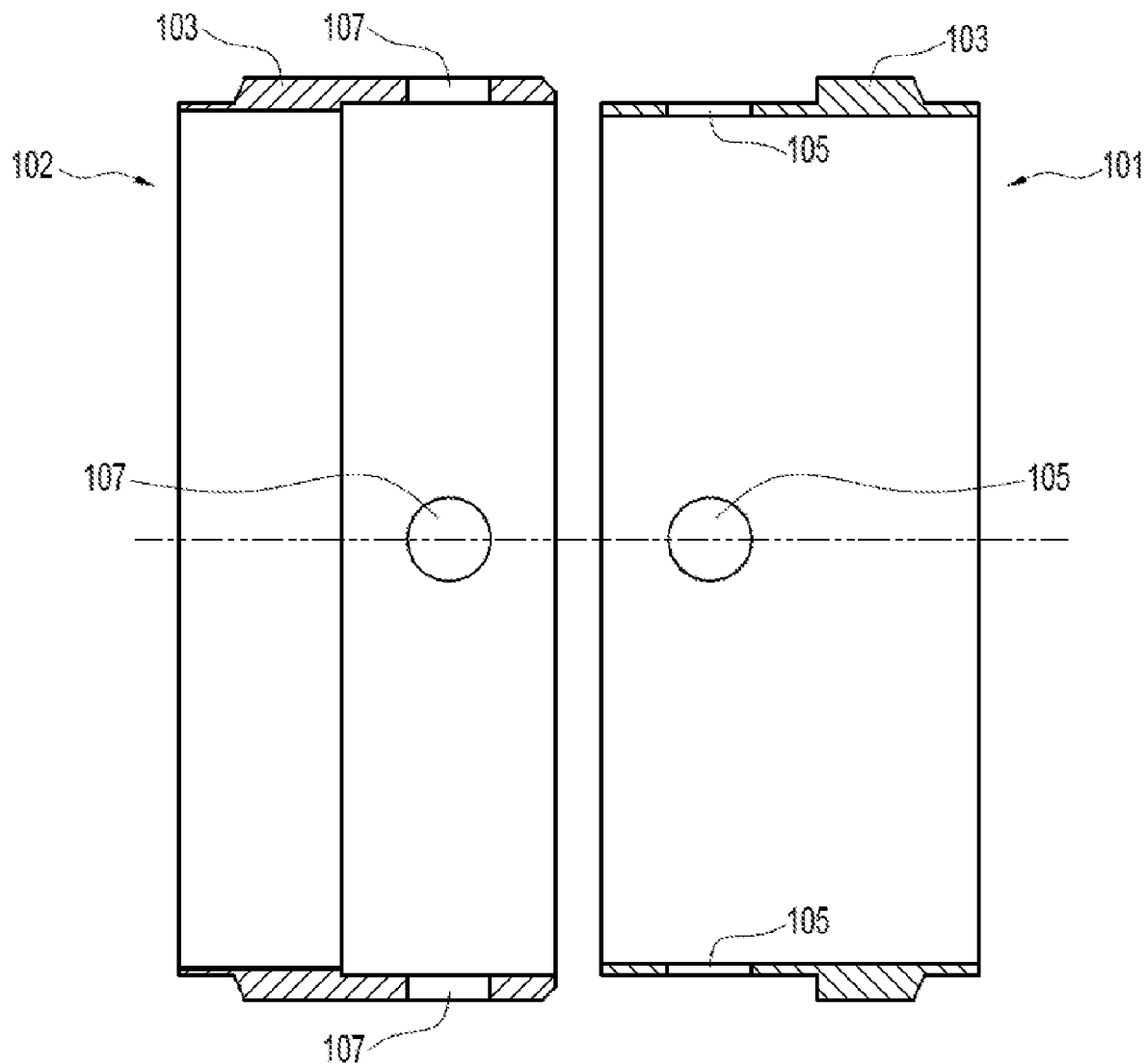
FIG. 2a is a cross-section view of the male and female couplers disconnected.
Figure 2B:
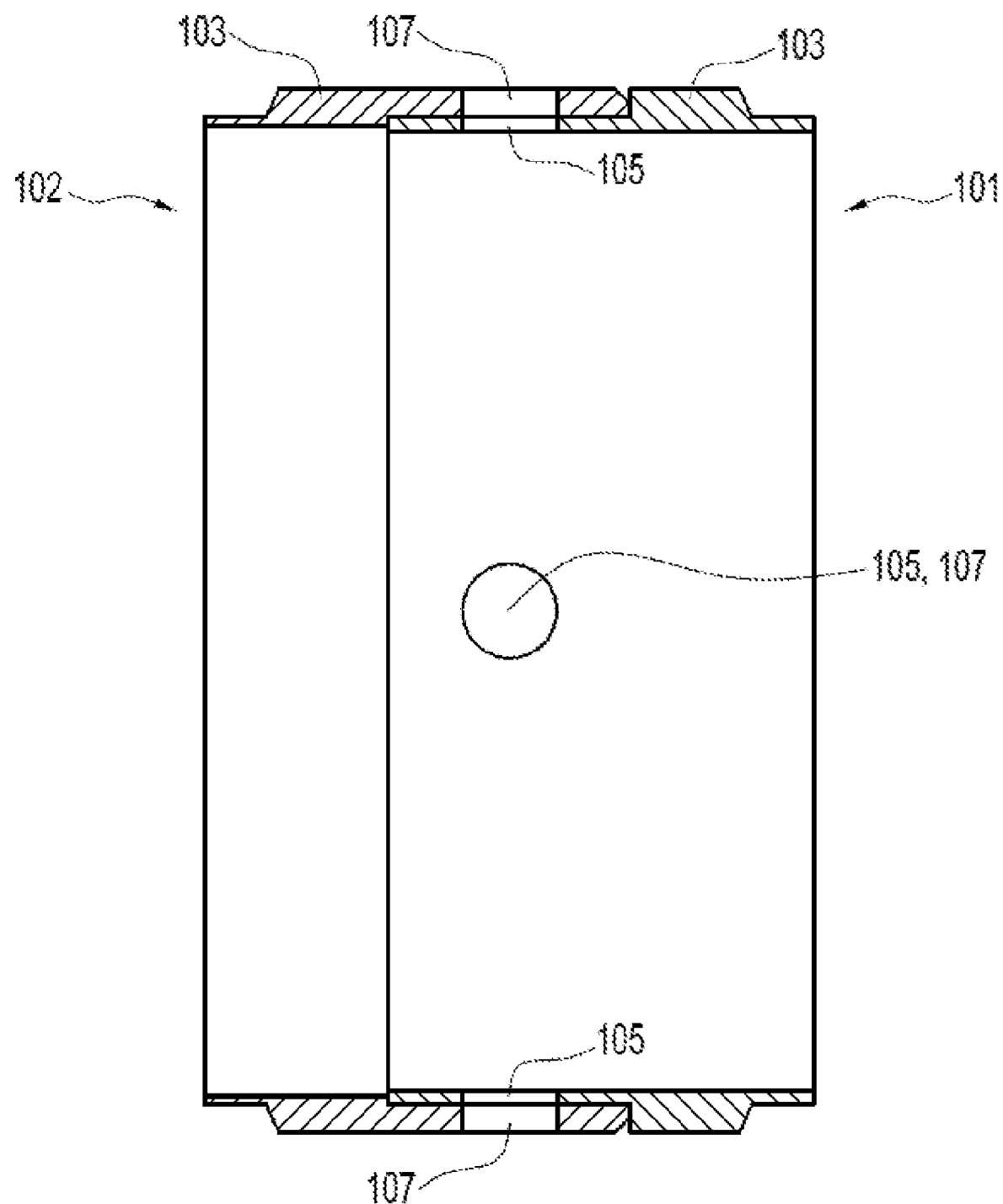
FIG. 2b is a cross-section view of the male and female couplers connected.
Figure 3:
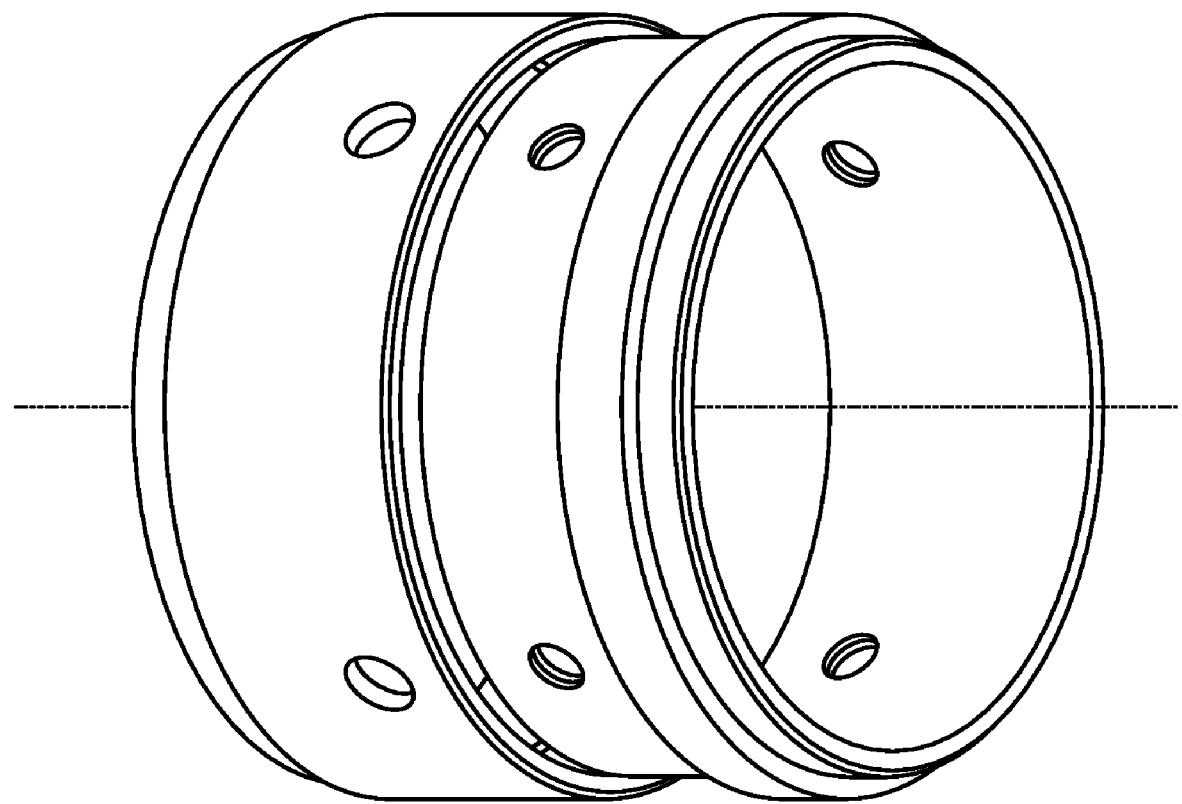
FIG. 3 is a perspective view of the male and female couplers disconnected.
Figure 4:
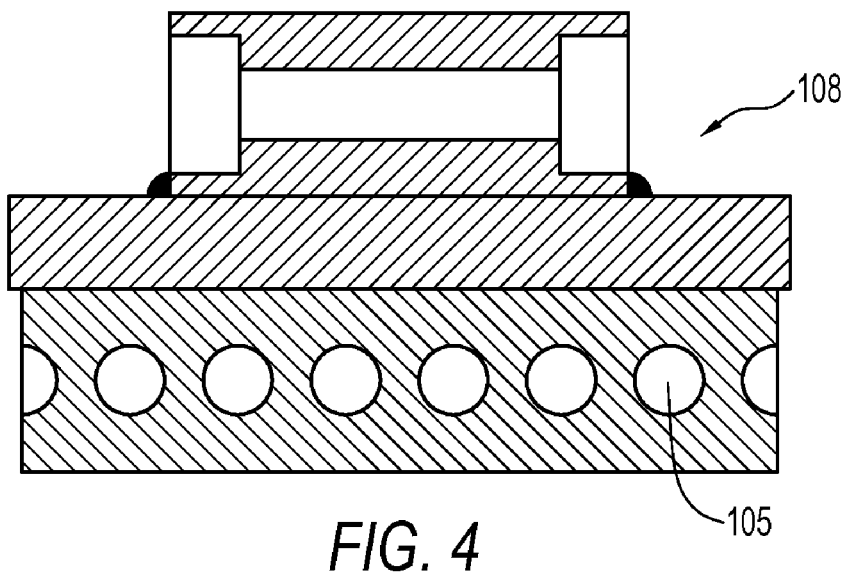
FIG. 4 is a side view of the top drive.
Figure 5:
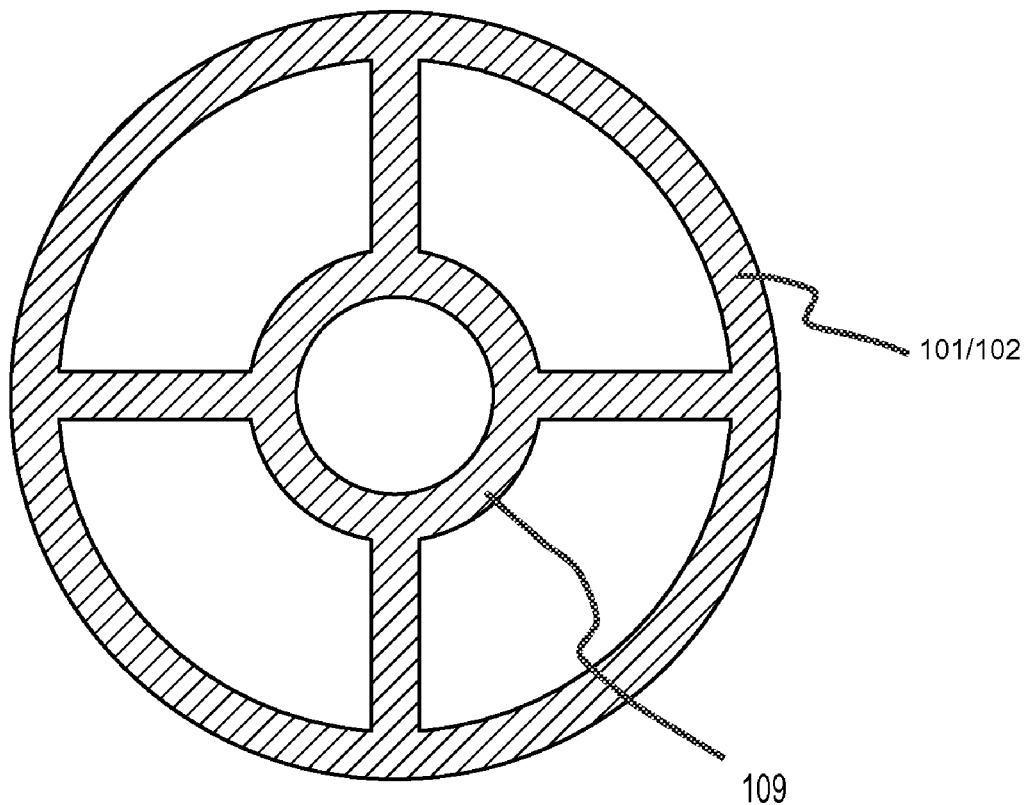
FIG. 5 is a top view of the centralizer ring.

Without any intent to limit the scope of this invention, reference is made to the figures in describing the various embodiments of the invention. FIGS. 1 through 5 depict various aspects of exemplary embodiments of the present invention.

The present invention relates to an anchor pile coupling system, which is used to connect sections of a piling together in order to maintain a continuous piling string (or length) which is driven into the earth using rotational energy.

The primary components of system 100 including a pair of complimentary rings, male coupling ring 101 and female coupling ring 102. Each ring has weld bevel 103 which is configured to engage a section of pile string 104 which are essentially sections of pipe that are driven into a surface to create foundational support for an object placed on top, provide a tether point for structures near pile string 104 or an anchor point for various purposes, in addition to other purposes for anchoring and support, both recognized in the art and potential future uses.

Male coupling ring 101 has on one opposite end, as disclosed, weld bevel 103 to attach to pile string 104. Bevel 103 can vary in size to match the diameter of pile string 104, so that there is a matched fit of male coupling ring 101 to pile string 104 for any diameter pile section. The other end of male coupling ring 101 is shaped to fit female coupling ring 102 fitting in a substantially flush manner, within female coupling ring 102. Further, this section of male coupling ring 101 which fits inside female coupling ring 102 has a plurality of threaded holes 105 about the circumference drilled perpendicularly, and which are configured to receive a bolt, screw, or similar fastening device 106 to affix male coupling ring 101 to female coupling ring 102.

Female coupling ring 102 is similarly configured, with weld bevel 103 on one end, but having a larger female connector on the opposite end for engaging male coupling ring 101 within female coupling ring 102. Female coupling ring 102 has plurality of holes 107 drilled circumferentially, and generally perpendicular to the axis of ring 102 which should ideally have placement in common with male coupling ring 101 so that they correspond, and a bolt, setscrew or other fastening device 106 can be inserted through holes 107 and into threaded holes 105. It should be noted that holes 107 can be threaded, but for ease of use and speed of installation, need not be. For more precise applications, however, threading may be desired. Though the holes must correspond with male coupling ring 101, additional holes 107 may be drilled so that many patterns may correspond to threaded holes 105 on male coupling ring 101, preventing an operator from having to line up a precise set of holes, but rather being able to select from various holes to fasten, reducing the amount of alignment required between the components.

Coupling driver 108 may also be a component part of the anchor pile driving system 100, which can be configured to attach to any number of drive types, such as a planetary drive on one end, and shaped in a similar fashion to male coupling ring 101 on the other. In this way, coupling driver 108 can be attached to male coupling ring 101 in order to drive the entire string into the surface below. Coupling driver's 108 male end is also configured to have a plurality of threaded holes 105 for engaging fastening device 106 while driving the piles.

Centralizer ring 109 may also be employed within male coupling ring 101 and/or female coupling ring 102 to provide a centralized conduit for a centralized reinforcement 110 to be inserted through. Rebar, as an example, can be inserted through the length of the pile string to provide this extra reinforcement. Centralizer ring 109 is generally not solid, however, and provides not only a conduit for centralized reinforcement 110, but also permits grout or other solidifying material to be added at the completion of pile string's 104 driving from the top and flow all the way down pile string 104 in open space 112, thus strengthening and fortifying the pile string 104.

To aid in the driving of pile string 104, lead screw 111 may be employed to help penetrate the surface being driven into, as well as the ground beneath. Lead screw 111 generally has a sharp-tipped end 113 for piercing the earth, as well as helical fins 114 for aiding in downward radial force and cleaning out the bored hole.

It should be noted that this entire string could be reversed in gender configuration with regard to male and female components, without significantly affecting the performance of the invention. In other words, coupling driver 108 can be female, and the pile ends reversed with regard to gender.

In operation, then, male coupling ring 101 and female coupling ring 102 are attached to opposite end of a portion of pile string 104 or series of pile strings 104 either by welding as provided by the disclosed weld bevel 103 or other attachment method (casting the entire section with coupling rings 101 and 102, etc.). The first pile string 104 is attached on one end to lead screw 111 and on the other to coupling driver 108, and then rotational energy is applied to coupling driver 108 and the drilling process begins. Once this initial pile 104 is driven, coupling driver 108 is detached from pile string 104. Centralized reinforcement 110 is in inserted inside pile string 104 for rigidity and added support. Then, another pile string 104 is mated to first pile string 104 using fastening device(s) 106. Coupling driver 108 is then attached to the opposite end of pile string 104 and the process is repeated. Once the desired depth is reached, pile string 104 is detached from coupling driver 108 and then the pile can be filled with grout, cement or other stabilizing material 115 in opening space 112, if desired.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

The invention claimed is:

1. An anchor pile coupling system for driving piles into a surface comprising:
   a. a male coupling ring having first and second opposite ends, wherein said first opposite end is shaped as a weld bevel for affixation to an anchor pile pipe section, and wherein said second opposite end has a plurality of threaded holes drilled circumferentially and perpendicular to said male coupling ring;
   b. a female coupling ring having first and second opposite ends, wherein said first opposite end is shaped as a weld bevel for affixation to an anchor pile pipe section, and wherein said second opposite end has a plurality of holes drilled circumferentially and perpendicular to said female coupling ring,
   c. wherein said female coupling ring's second opposite end is operatively configured to engage said second opposite end of said male coupling ring; and
   d. a coupling driver having first and second opposite ends, wherein said first opposite end is configured to be attached to a planetary drive, and wherein said second opposite end of said coupling driver has a plurality of threaded holes about its circumference for attachment of said female coupling ring to said second opposite end of said coupling driver.

2. The anchor pile coupling system of claim 1 further comprising a centralizer ring shaped to receive a length of tubing similar in length to said pile, and configured to operatively attach to the inner diameter of said male coupling ring.

3. The anchor pile coupling system of claim 1 further comprising a lead screw having first and second opposite ends and configured to be the initial portion of said pile to be driven, and wherein said first opposite end is configured to pierce said surface, and further comprising a plurality of helical portions affixed to the outer portions of said lead screw to aid in driving said pile.

4. The anchor pile coupling system of claim 1 further comprising a centralizer ring shaped to receive a length of tubing similar in length to said pile, and configured to operatively attach to the inner diameter of said female coupling ring.

5. An anchor pile coupling system for driving piles into a surface comprising:
   a. a male coupling ring having first and second opposite ends, wherein said first opposite end is shaped as a weld bevel for affixation to an anchor pile pipe section, and wherein said second opposite end has a plurality of threaded holes drilled circumferentially and perpendicular to said male coupling ring;

b. a female coupling ring having first and second opposite ends, wherein said first opposite end is shaped as a weld bevel for affixation to an anchor pile pipe section, and wherein said second opposite end has a plurality of holes drilled circumferentially and perpendicular to said female coupling ring, c. wherein said female coupling ring's second opposite end is operatively configured to engage said second opposite end of said male coupling ring; and d. a coupling driver having first and second opposite ends, wherein said first opposite end is configured to be attached to a planetary drive, and wherein said second opposite end of said coupling driver has a plurality of threaded holes about its circumference for attachment of said male coupling ring to said second opposite end of said coupling driver.

6. The anchor pile coupling system of claim 5 further comprising a centralizer ring shaped to receive a length of tubing similar in length to said pile, and configured to operatively attach to the inner diameter of said male coupling ring.

7. The anchor pile coupling system of claim 5 further comprising a lead screw having first and second opposite ends and configured to be the initial portion of said pile to be driven, and wherein said first opposite end is configured to pierce said surface, and further comprising a plurality of helical portions affixed to the outer portions of said lead screw to aid in driving said pile.

8. The anchor pile coupling system of claim 5 further comprising a centralizer ring shaped to receive a length of tubing similar in length to said pile, and configured to operatively attach to the inner diameter of said female coupling ring.

* * * * *